United States Patent [19]
Ogawa et al.

[11] Patent Number: 5,643,436
[45] Date of Patent: Jul. 1, 1997

[54] ARCHITECTURAL MATERIAL USING METAL OXIDE EXHIBITING PHOTOCATALYTIC ACTIVITY

[75] Inventors: Takatoshi Ogawa; Yasuhiko Yoshioka; Nobuo Tsubouchi; Toshio Saito; Tamotsu Hasegawa, all of Tokyo; Akira Fujishima, Kawasaki; Kazuhito Hashimoto, Yokohama, all of Japan

[73] Assignee: Takenaka Corporation, Osaka, Japan

[21] Appl. No.: 480,918

[22] Filed: Jun. 7, 1995

Related U.S. Application Data

[62] Division of Ser. No. 120,929, Sep. 15, 1993.

[30] Foreign Application Priority Data

Sep. 22, 1992 [JP] Japan .................. 4-252931
Nov. 6, 1992 [JP] Japan .................. 4-297395

[51] Int. Cl.$^6$ .............. C25D 11/04; C23C 8/10; C22C 32/00
[52] U.S. Cl. .............. 205/324; 148/289; 148/285; 148/286; 419/19
[58] Field of Search .............. 205/139, 171, 205/149, 150, 151, 152, 153, 154, 155, 156, 205, 206, 316, 324; 148/284, 285, 286, 287; 419/19

[56] References Cited

U.S. PATENT DOCUMENTS

| | | | |
|---|---|---|---|
| 3,087,831 | 4/1963 | Browne | 117/35 |
| 3,436,203 | 4/1969 | Wu | 65/374 |
| 3,466,230 | 9/1969 | Carithers | 205/171 |
| 3,746,568 | 7/1973 | Rybarczyk | 117/95 |
| 3,909,369 | 9/1975 | Udupa et al. | 205/205 |
| 3,962,514 | 6/1976 | Rittler | 428/334 |
| 4,050,956 | 9/1977 | Bruin | 148/6 |
| 4,364,995 | 12/1982 | Crawford | 428/336 |
| 4,786,563 | 11/1988 | Gillery | 428/630 |
| 4,904,526 | 2/1990 | Koskenmaki | 428/328 |
| 4,910,180 | 3/1990 | Berndt et al. | 502/304 |
| 5,085,926 | 2/1992 | Iida | 428/216 |
| 5,120,707 | 6/1992 | Maxfield et al. | 205/1 |
| 5,160,366 | 11/1992 | Shibata et al. | 75/232 |
| 5,229,194 | 7/1993 | Lingle | 428/216 |
| 5,318,725 | 6/1994 | Sandhage | 252/520 |

FOREIGN PATENT DOCUMENTS

| | | |
|---|---|---|
| 0288070 | 10/1988 | European Pat. Off. . |
| 0288071 | 10/1988 | European Pat. Off. . |
| 63-107815 | 5/1988 | Japan . |
| 2-9850 | 3/1990 | Japan . |
| 3-73304 | 3/1991 | Japan . |

OTHER PUBLICATIONS

"The Society for Antibacterial and Antifungal Agents, Japan", vol. 13, No. 5 (1985).

*Primary Examiner*—Kathryn L. Gorgos
*Assistant Examiner*—Edna Wong
*Attorney, Agent, or Firm*—Oliff & Berridge

[57] ABSTRACT

A metal-oxide layer exhibiting a photocatalytic activity function is formed on the surface of an inorganic architectural material, such as external wall material, roofing material, internal wall material, flooring material, and ceiling material, including glass, tile, concrete, stone, metal, and the like, so as to provide the property of deodorizing a space coming in contact with the architectural material, and antimold, antisoiling properties, and ultraviolet-ray absorbency of the surface of the architectural material, as well as the long-term maintenance of these properties. Preferably, the metal-oxide layer is formed by fixing a metal-oxide thin film on the surface of the architectural material. Alternatively, the metal-oxide layer is formed as an architectural material in which the surface thereof and its vicinity are mainly formed of a metal mixture including a metal oxide, such as titanium oxide, and palladium for improving photocatalytic activity, or a metal mixture including a metal constituting the metal oxide, such as titanium, and a composite of a second metal, while its inner portion is substantially formed of a metal mixture including titanium or a composite of titanium and palladium, the surface and its vicinity as well as the inner portion being formed continuously.

11 Claims, 17 Drawing Sheets

ARCHITECTURAL MATERIAL USING METAL OXIDE EXHIBITING PHOTOCATALYTIC ACTIVITY

This is a Division of application Ser. No. 08/120,929 filed Sep. 15, 1993 now pending.

BACKGROUND OF THE INVENTION

1. Field of the Invention:

The present invention relates to an architectural material, and more particularly to an architectural material excelling in deodorizing, antimold, and antisoiling properties, and further to an architectural material excelling in peel resistance and durability, as well as a simple method for manufacturing an architectural material excelling in the deodorizing property and durability.

2. Description of the Related Art:

As environmental problems have come more into focus, issues of deodorizing indoor spaces, and antimold and antisoiling properties of architectural material surfaces, and the like have come to attract attention.

Concerning deodorization, a method is conventionally known in which an apparatus or a piece of equipment is used for exhausting unwanted odors to the outside. As for antimold needs, the removal of molds by means of chemicals is performed by selecting an appropriate chemical according to the kind of mold. Regarding antisoiling needs, periodical cleaning by a person is only carried out.

Odors, molds, and soiling are essentially attributable to microorganisms, such as bacteria, yeasts and molds, and animal and plant cells. Accordingly, the attempt to deodorize and prevent molds and fouling can, in principle, be considered as the destruction of these cells, i.e., sterilization. Generally known methods of sterilization include heating, irradiation with ultraviolet or other radioactive rays, cell destruction by means of ultrasonic waves, electric sterilization, gas sterilization, and sterilization using chemicals including antibiotics. In addition, a sterilization method using fine particles of a photo-semiconductor is also known. As part of this line of effort, basic research is being undertaken on the removal of organic and inorganic contaminants in water and air by using titanium dioxide photocatalysts. Namely, semiconductors such as titanium dioxide are known to exhibit a photocatalytic function by means of a light of a specific wavelength and possess deodorizing and antimold functions through their powerful oxidizing action. It is stated on page 211 of Vol. 13, No. 5 (1985), of the "Bohkinbohkabi (Fungus and Mold Prevention) Journal" that a fixed film consisting of fine particles of titanium dioxide is useful as a sterilizing reactor. In addition, Japanese Patent Publication No. 9850/1990 discloses a method of purifying wastes by the use of a semiconductor, such as titanium oxide, which carries a metal or a metal oxide therein.

Conventionally, titanium dioxide, iron oxide, tungsten oxide, silicon oxide and the like having a semiconductor function, or such metals carrying a second metal, such as platinum, thereon for the purpose of improving the catalytic function are used as photocatalysts. To make use of the deodorizing and antimold functions, such metals are pulverized into fine particles to form a fixed film on a surface, or the fine particles are used by being dispersed in an object to be treated.

Although various studies have been made regarding methods of imparting the deodorizing and antimold functions to architectural materials by making use of the photocatalytic function, in accordance with the above-described method, particles are troublesome to handle as materials. The known fixed films have only been used experimentally, and their strength is not sufficient. The fabrication of semiconductor materials into thin film has been industrially difficult, and has not yet been put to practical use.

As described above, for deodorizing, an apparatus or piece of equipment must have a sophisticated function and made large in size, which results in high running cost and is clearly uneconomical. Moreover, since air is exhausted through an opening of a limited size, it is extremely difficult to deodorize the entire indoor space. The conventional antimold method is no more than a short-term measure, and the long-term maintenance of the antimold property remains unresolved. As for the antisoiling property, if the cleaning of the outer wall surfaces of large buildings is considered, huge expenses are required for manpower needed for cleaning, and, since the long-term maintenance of the antisoiling property is not ensured, repeated cleaning operations are unavoidably carried out. Furthermore, as for the deodorization, antimolding, and antisoiling of architectural materials, the conventional sterilization methods are either impractical or difficult to put to practical use in the light of long-term maintenance, economy, technical difficulties, inexperience in techniques, and the like.

SUMMARY OF THE INVENTION

In view of the above-described circumstances, it is a primary object of the present invention to provide an architectural material which excels in the property of deodorizing an indoor space which comes in contact with the architectural material and in antimold and antisoiling properties, as well as ultraviolet-ray absorbency of the surface of the architectural material, and excels in the long-term maintenance of these properties and economic efficiency, without impairing features of design.

A second object of the present invention is to provide an architectural material which, in addition to deodorizing and antimold functions imparted by using a photocatalytic function, has high efficiency in the photocatalytic function, is easy to manufacture, has high strength, excels in the peel resistance and durability, and facilitates processing into a shape suited to a purpose.

A third object of the present invention is to provide a simple method of manufacturing an architectural material which is uniform and excels in durability and deodorizing and antimold effects.

The present inventors took note of the properties of metal oxides, architectural materials, characteristics of light and the like. As a result of conducting strenuous research the inventors attained the objects and completed the present invention by providing a layer exhibiting photocatalytic activity on the surfaces of materials of various kinds.

Furthermore, the present inventors attained the objects and completed the invention by combining architectural materials of various kinds with metal oxides exhibiting photocatalytic activity and capable of forming a desired transparent film.

The architectural material in accordance with a first aspect of the present invention, when seen as a basic material, includes nonferrous inorganic materials such as glass, stone, stone-quality products, and sintered clay products; metallic inorganic materials such as iron and steel products; and organic materials such as wood, wood-quality products, and high polymer and plastic products. On these architectural materials, a thin film of a metal oxide needs to be formed.

In this case, inorganic materials and heat-resistant organic materials are preferably used since the architectural materials are formed at a high temperature of, for instance, 400° C. and because of their affinity with the metal oxides. In a case where the formation of a thin film is possible at a relatively low temperature, ordinary organic materials may be used.

The architectural material in accordance with the present invention is used suitably as an external wall material, a roofing material, an internal wall material, a flooring material, a ceiling material, and so on. More specifically, the architectural material is used for exterior surface portions including the external wall (including glass windows) and roof tiles, and interior surface portions such as interior walls of a living room, a toilet room and the like, a floor, and a ceiling. As specific examples of inorganic materials used for these portions, it is possible to cite glass, tile, tiles used for roofing, concrete, stone, metal, and composite materials thereof.

The metal oxide used in the present invention may be any of the semiconductors insofar as they are activated upon being irradiated with light and drive oxidation and reduction reaction. For example, it is possible to use at least one compound selected from the group consisting of titanium dioxide, iron oxide, silver oxide, copper oxide, aluminum oxide, tungsten oxide, silicon oxide, zinc oxide, and strontium titanate. Also, metals or other metal oxides modifying this metal oxide may be used suitably for promoting the photocatalytic reaction, and it is possible to use at least one compound selected from the group consisting of, for example, platinum, palladium, gold, silver, copper, nickel, rhodium, niobium, tin, cobalt, ruthenium oxide, and nickel oxide. As the amount added to modify the metal oxide, it is preferable to use such metals or metal oxides in the range of from 0.01 to 20 wt. % with respect to the metal oxide in the present invention.

As the method of preparing the aforementioned metal oxide, the metal oxide may be prepared by high-temperature sintering of a metal, electrolytic oxidation, a chemical deposition process, a vacuum deposition process, a coating process, a coprecipitation process, an evaporation oxidation process such as a metallic halogenation process, neutralization and hydrolysis of an inorganic metal salt, hydrolysis of a metal alkoxide, and a sol-gel process. Alternatively, a commercially available product may be used. As the method of modifying the aforementioned metal or other metal oxide, it is possible to use a conventionally used method, such as a impregnation method, a precipitation method, an ion-exchange method, an optoelectrodeposition method, a kneading method.

In the present invention, as for the method of forming a thin film of a metal oxide on the architectural material, a method is adopted in which a metal oxide is fixed on a part or the whole of a surface of an architectural material having a planar, curved or complicated surface through at least one method, including spray coating, dip coating, spin coating, and sputtering.

The metal oxide thin film formed as described above has deodorizing and antimold properties. Its structure, when seen microscopically, is porous, so that the strength of the film itself and the bonding force with respect to the architectural material, i.e., the base, are insufficient. As a result, there is a possibility that the thin film may become broken or peeled off while in use. Accordingly, to improve the film strength and the bonding force with respect to the base, it is preferable to effect heat treatment. The conditions of heat treatment may be selected in accordance with the kind of metal oxide used, the strength and the deodorizing and antimold performance which are required of a portion for which the architectural material is used. For instance, in the case of titanium oxide, heat treatment is effected in the temperature range of from 100° to 800° C., preferably 200° to 600° C. If the temperature is less than 100° C., the bonding force is insufficient. On the other hand, if the temperature exceeds 800° C., it is undesirable since the crystalline structure of the metal oxide undergoes a change, the photocatalytic activity is lost, and an internal crack occurs due to the difference in the coefficient of thermal expansion between the film and the base during cooling, resulting in a decline in the bonding force. Heat treatment is performed for about 20 to 120 minutes in an electric furnace. The architectural material is subsequently allowed to gradually cool to room temperature. Sudden cooling is undesirable since a crack will occur due to the difference in the coefficient of thermal expansion between the film and the base, causing a decline in the bonding force.

The transparency of the above-described thin film is an important element in forming a thin film on an architectural material having a feature of design, such as glass. By setting the film thickness of the metal oxide to several microns or thereabouts, it is possible to obtain a transparent thin film having deodorizing and other functions. However, in a case where transparency is not necessarily required, the advantages of the present invention are not hampered even if this element is not taken into consideration.

Light energy based on irradiation, which is used in the present invention, includes a wavelength region corresponding to the excitation of photocatalysis. Specifically, it is preferable to use light energy which includes an ultraviolet wavelength below 400 nm, which contributes to the photocatalytic reaction. As the light energy source, it is possible to cite a natural light source from the sun, as well as an artificial light source such as light from a mercury lamp, light from a fluorescent lamp, light from a filament lamp like a halogen lamp, light from a short-arc xenon lamp, and a laser beam. In addition, as an auxiliary light source for the rays of the sun, an artificial light source may be used concurrently.

As the method of irradiation, it is possible to use a method in which the light is directly radiated onto the metal-oxide thin film formed on the architectural material, or, in the case of a transparent architectural material such as glass, it is possible to use a method in which the light is radiated onto the thin film therethrough, or sunlight and artificial light are used jointly to irradiate the thin film from various angles.

In the present invention, if the light is radiated onto the material on which a metal-oxide thin film exhibiting photocatalytic activity is formed, odors, molds, and substances constituting causes of soiling (hereafter referred to as unwanted substances), which adhere to or are in contact with the surface of the architectural material where the thin film is formed, can be decomposed and removed at normal temperature photochemically through the photocatalysis of the thin film. Accordingly, unlike conventional techniques, physical labor, large-scale equipment and facilities, and maintenance are practically unrequired. At the same time, since such inexhaustible energy as sunlight can be used as the light energy, unwanted substances can be decomposed and removed very economically and simply. As compared with conventional catalysts, such as oxidation catalysts, the metal oxide used as the photocatalyst in the present invention undergoes a small decline in activity due to heat deterioration and poisoning elements, so that the functions of decomposing and removing the unwanted substances, i.e., the deodorizing property, the antimold property, and the antisoiling property are maintained over long periods of time. In addition, the architectural material with a thin film formed thereon in accordance with the present invention absorbs ultraviolet rays. Accordingly, if the present invention is applied to window glass with the thin film formed thereon, since the light passing therethrough does not include harmful ultraviolet rays, adverse effects are not exerted on human bodies, and it is possible to prevent the deterioration of interior materials such as the coating in a living room, wall covering, and tatami mats.

As the mechanism of decomposing and removing unwanted substances on the metal-oxide thin film, which shows the photocatalytic activity, as the light energy is made incident upon the metal-oxide thin film by irradiation, reaction-active electrons and holes are produced on the surface of the metal oxide. These electrons and holes react directly with the unwanted substances, or active OH radicals, which are produced as the electrons and holes react with water, react with the unwanted substances. This is considered to be the mechanism of reforming the unwanted substances. In addition, even if the reactivity of the above-described photocatalyst itself is not intense, the absorbed light energy is converted into heat, presumably making it possible to accelerate the reaction.

Next, a description will be given of the architectural material in accordance with a second aspect of the present invention.

The architectural material in accordance with the second aspect of the present invention is structured such that the surface of the architectural material and its vicinity are formed of a metal mixture including a metal oxide which exhibits a photocatalytic function, such as titanium dioxide, and a second metal for improving the photocatalytic function, and its inner portion is formed of a metal mixture including a metal of the same kind as that which constitutes that metal oxide, such as titanium, and the second metal for improving the photocatalytic function, the surface and its vicinity as well as the inner portion being formed continuously. As such, a uniform photocatalytic phase is formed on the surface, and the architectural material demonstrates an excellent deodorizing and antimold effect by virtue of the efficient photocatalytic reaction. In addition, since the photocatalytic phase is formed rigidly and continuously, the catalyst phase does not peel off, and processing is facilitated.

In addition, in the method of manufacturing an architectural material in accordance with a third aspect of the present invention, the architectural material is manufactured by forming and processing a metal mixture (an alloy) which includes a metal of the same kind as the metal constituting the aforementioned metal oxide, such as titanium, and a second metal for improving the photocatalytic function, and then subjecting the metal mixture to oxidation treatment. Accordingly, a uniform architectural material of an arbitrary shape which excels in deodorizing and antimold effects can be obtained by a simple method.

Other objects, features and advantages of the present invention will become more apparent from the following detailed description of the invention when read in conjunction with the accompanying drawings.

DETAILED DESCRIPTION OF THE PREFERRED EMBODIMENTS

Hereafter, a more detailed description of the present invention will be given by citing embodiments, but the present invention is not limited to these embodiments and various modifications are possible within the scope of the present invention.

[Embodiment I]

(1) After a titanium dioxide sol was applied to quartz glass by spin coating, it was sintered at 400° C. for 30 minutes to form a film, thereby obtaining a glass/titanium dioxide thin-film architectural material (GT-1).

(2) By using tile instead of the quartz glass, a tile/titanium dioxide thin-film architectural material (TT) was obtained in a manner similar to (1) above.

(3) In a manner similar to (1) above except that the sintering temperature was set at 200° C., a glass/titanium dioxide thin-film architectural material (GT-2) was obtained.

(4) In a manner similar to (1) above except that strontium titanate ($SrTiO_3$) powder was added to the titanium dioxide sol and that the sintering temperature was set at 200° C., a glass/titanium dioxide-strontium titanate thin-film architectural material (GTS) was obtained.

(5) In a manner similar to (4) above except that titanium dioxide powder (P-25) was added to the titanium dioxide sol, a glass/titanium dioxide thin-film architectural material (GTT) was obtained.

(6) 0.01% palladium was carried in the titanium dioxide thin film of (1) above, and a glass/titanium dioxide-palladium thin-film architectural material (GTP) was obtained.

[Evaluation Test Examples]

(1) Evaluation of deodorizing property

Figure 1:
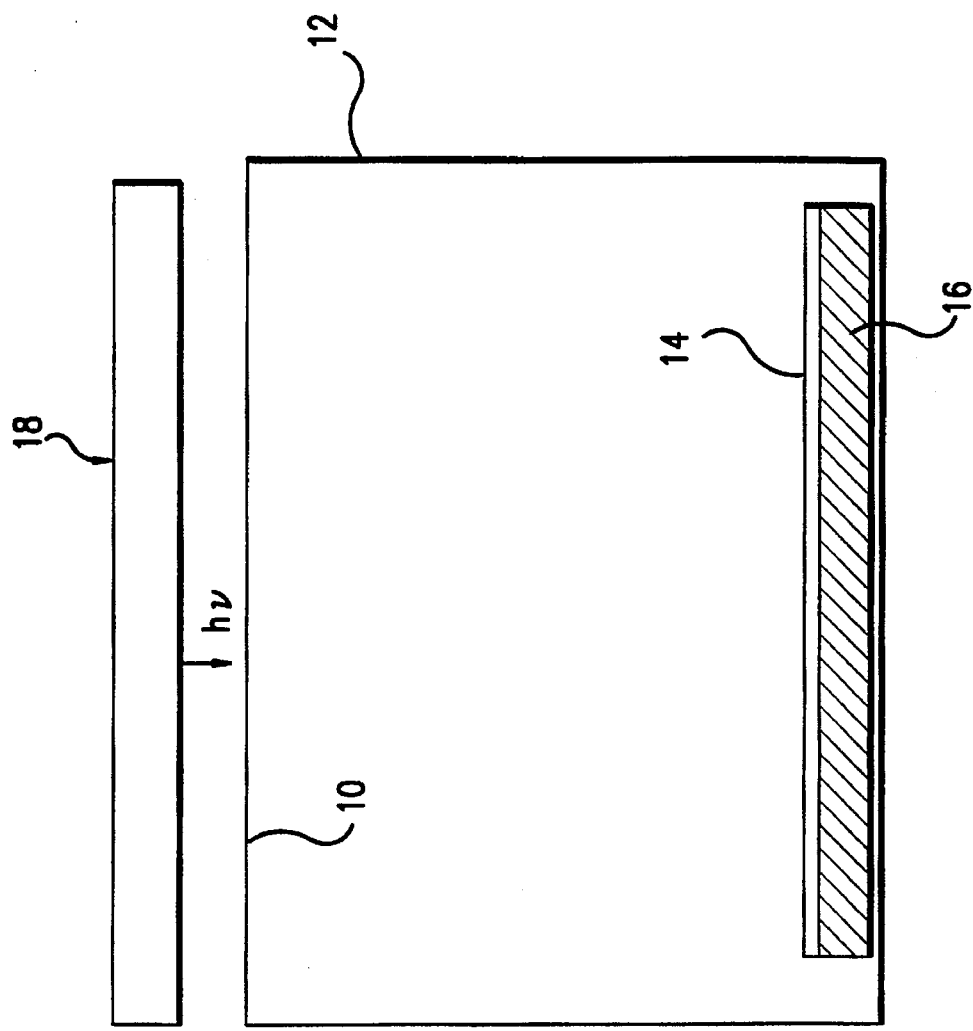
FIG. 1 is a cross-sectional view of an apparatus for evaluating a deodorizing property in accordance with an embodiment of the present invention.

FIG. 1 shows an apparatus for evaluating the deodorizing property. An architectural material (base) 16 having thereon a metal-oxide thin film 14, which was obtained in examples (1) to (6) was placed, with the thin-film surface facing upward, in the bottom of an experiment tank (with a 1-liter capacity) 12 formed of quartz glass 10. 5 ppm of acetaldehyde was added inside the experiment tank 12, and light was radiated onto the thin film 14 for 60 minutes from above the experiment tank 12 by using a black light (BL) lamp 18 (in the drawing, hv represents light energy). The change over time of the residual rate (%) of acetaldehyde was determined, and the degree of decline in the residual rate was used as a measure in the evaluation of the deodorizing property. Acetaldehyde is one of the eight offensive odor substances designated by the Japanese Offensive Odor Control Law. The concentration of the acetaldehyde was measured by gas chromatography. In addition, the evaluation of the deodorizing property was also conducted by using sunlight instead of the BL lamp 18.

Example 1 of Evaluation of Deodorizing Property

Figure 2:
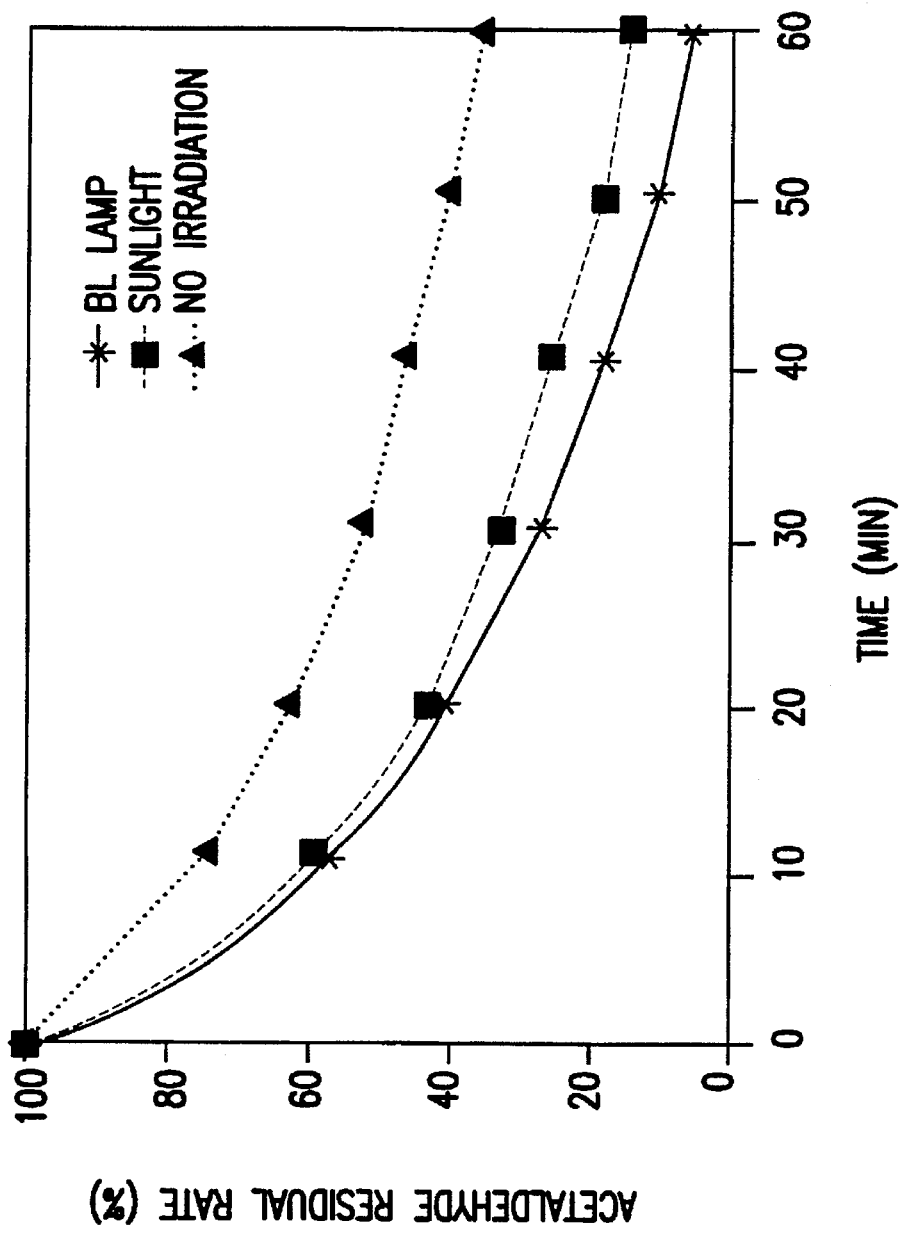
FIG. 2 is a diagram illustrating curves of acetaldehyde (unwanted substance) residual rate due to differences in a light source in accordance with example 1 for evaluating the deodorizing property.

By using the glass/titanium dioxide thin-film architectural material (GT-1), the deodorizing property was evaluated under the conditions of no irradiation, irradiation by the BL lamp, and irradiation by sunlight. The results are shown in FIG. 2. As can be seen from FIG. 2, although the acetaldehyde residual rate decreases over time, the degree of decline is large in the cases of irradiation by the BL lamp and irradiation by sunlight, which shows that the architectural material of the present invention excels in deodorizing property.

Example 2 of Evaluation of Deodorizing Property

Figure 3:
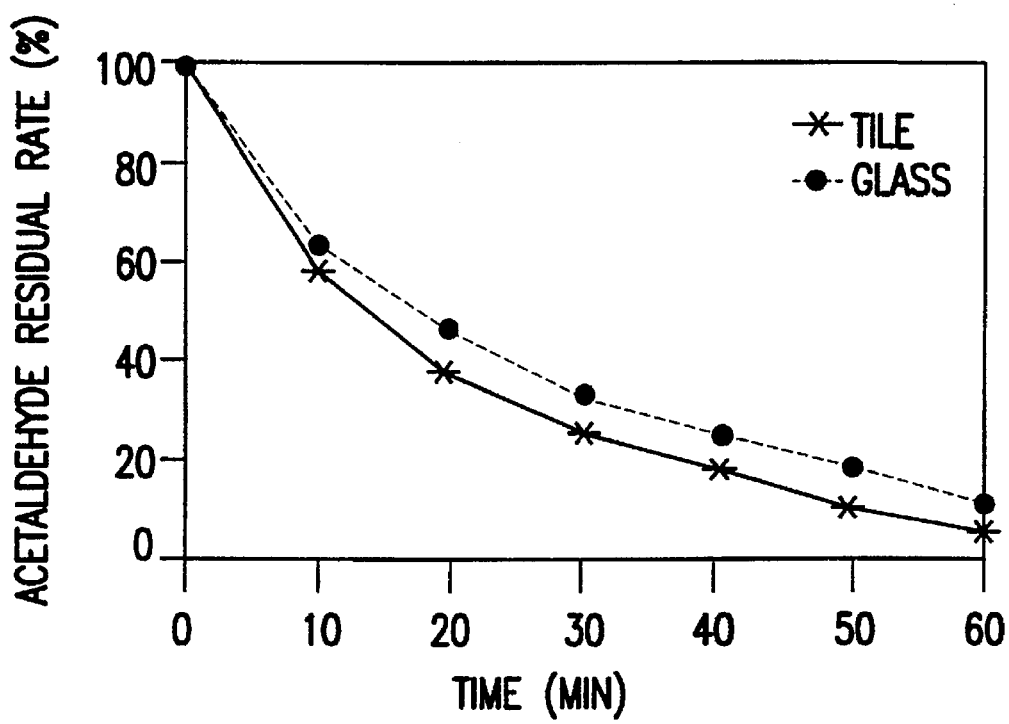
FIG. 3 is a diagram illustrating curves of acetaldehyde residual rate due to differences in a base of an architectural material in accordance with example 2 for evaluating the deodorizing property.

By using the tile/titanium dioxide thin-film architectural material (TT), the deodorizing property was evaluated under the condition of irradiation by the BL lamp (all the evaluations of the deodorizing property described below were made under the same irradiation condition). The results are shown in FIG. 3. Whether the tile is used or the glass is used, the architectural material excels in the deodorizing property.

Example 3 of Evaluation of Deodorizing Property

Figure 4:
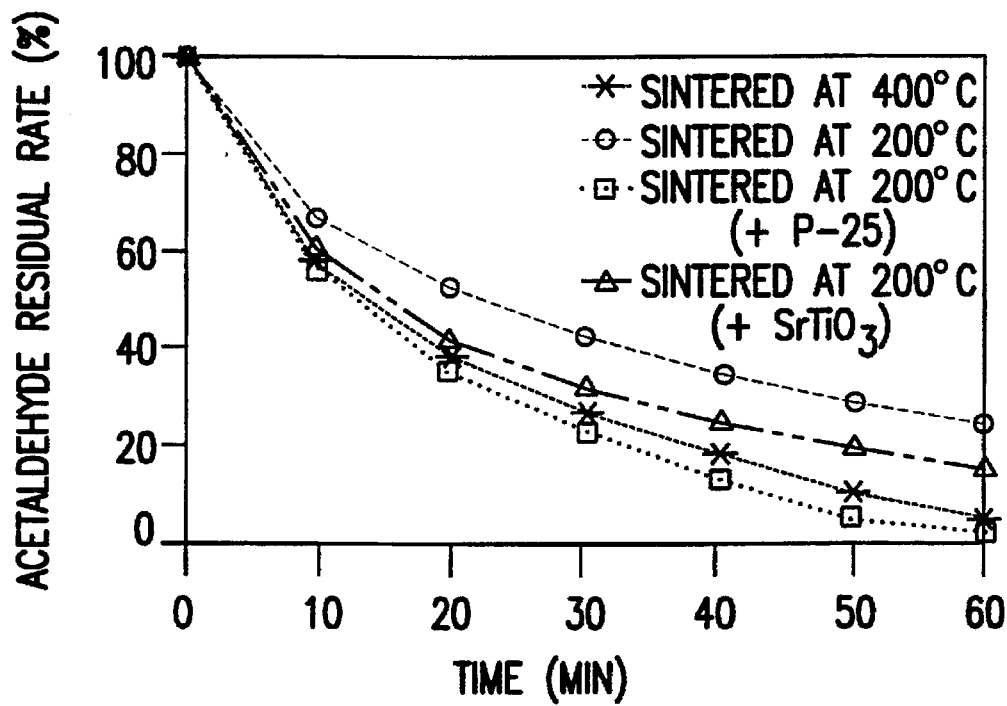
FIG. 4 is a diagram illustrating curves of acetaldehyde residual rate due to differences in a metal-oxide thin film in accordance with example 3 for evaluating the deodorizing property.

The deodorizing property was evaluated by using the respective architectural materials having a thin film formed thereon, including the 400° C. sintered glass/titanium dioxide thin film (GT-1), the 200° C. sintered glass/titanium dioxide thin film (GT-2), the 200° C. sintered glass/titanium dioxide-P-25 thin-film (GTT), and the 200° C. sintered glass/titanium dioxide-$SrTiO_3$ thin film (GTS). The results are shown in FIG. 4. Although there are slight differences in the effect, it can be recognized that the architectural material using any one of the thin films excels in the deodorizing property.

Example 4 of Evaluation of Deodorizing Property

Figure 5:
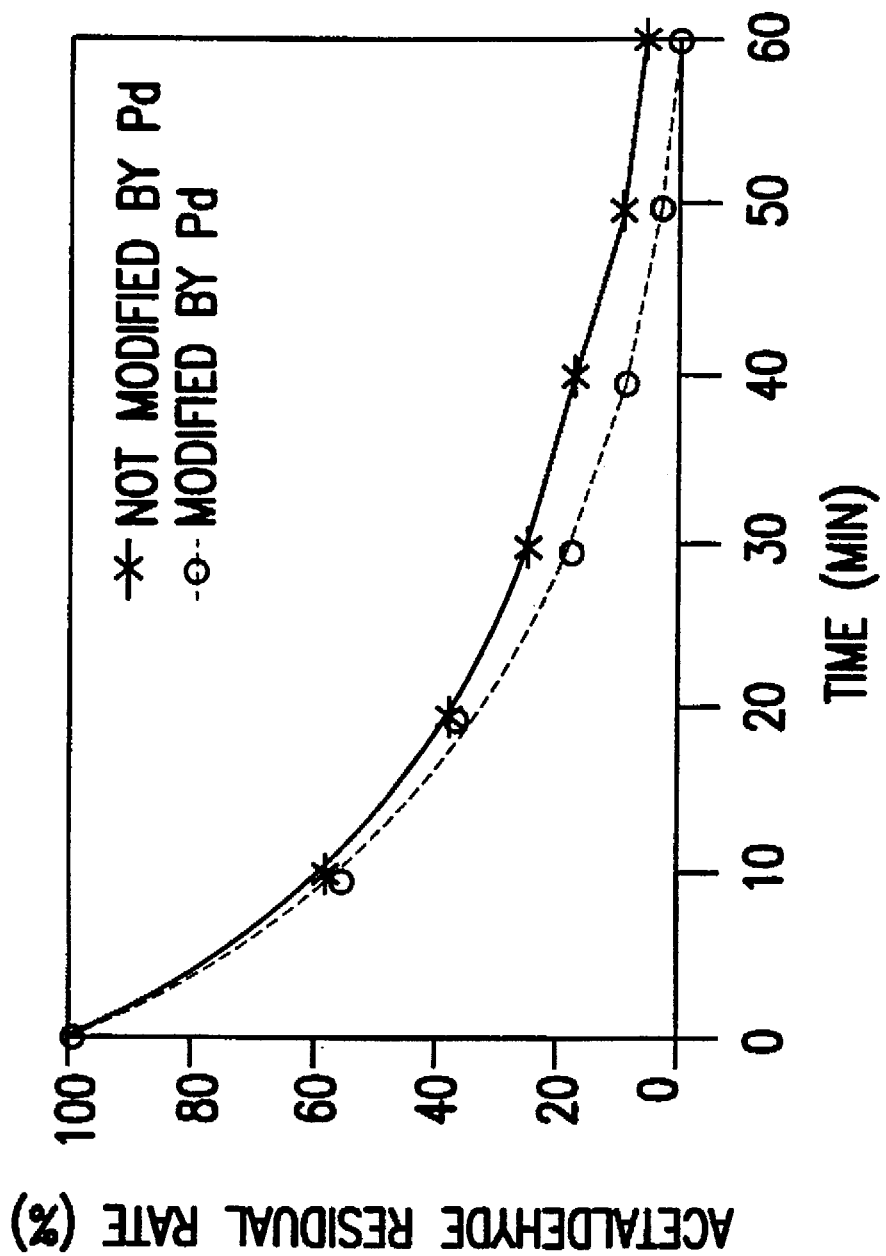
FIG. 5 is a diagram illustrating curves of acetaldehyde residual rate due to differences in a metal-oxide thin film in accordance with example 4 for evaluating the deodorizing property.

The deodorizing property was evaluated by using the glass/titanium dioxide-palladium thin-film architectural material (GTP). The results are shown in FIG. 5. It can be appreciated that the architectural material modified by palladium (Pd) excels in the deodorizing property more than the material not modified by Pd.

(2) Example of evaluation of antisoiling property

The glass/titanium dioxide thin-film architectural material (GT-1) and ordinary glass without a thin film (G) were immersed in a water tank for goldfish, and irradiated by the BL lamp. Consequently, a green alga began to grow on the surface of G about a week later, but (GT-1) did not undergo any change at all. This fact shows that the antisoiling property of the architectural material with the thin film formed thereon in accordance with the present invention is excellent.

(3) Example of evaluation of ultraviolet-ray absorption property

Figure 6:
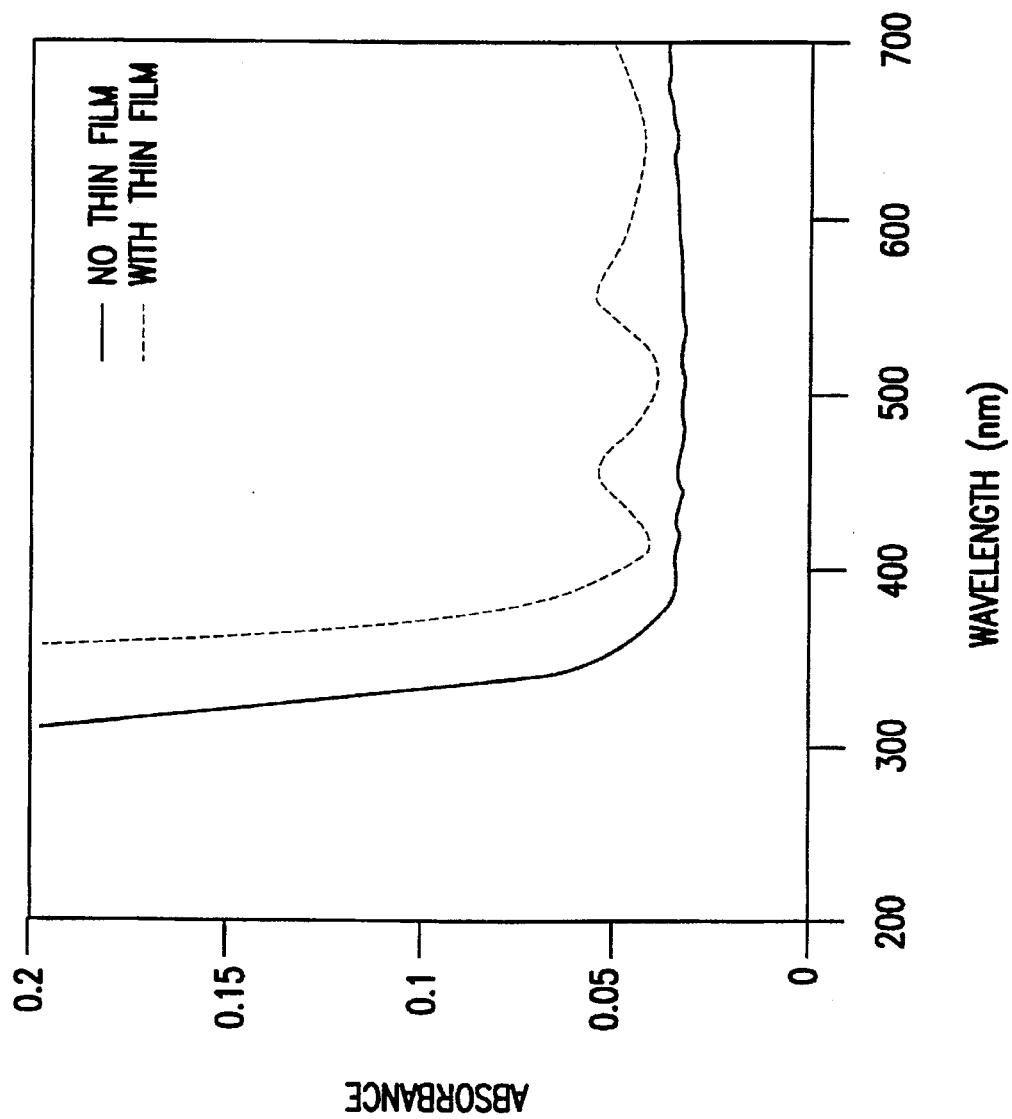
FIG. 6 is a diagram illustrating curves of ultravioletray absorption by an architectural material of the present invention with a thin film formed thereon in accordance with an example for evaluating ultraviolet-ray absorbency.

With respect to the glass/titanium dioxide thin-film architectural material (GT-1) and ordinary glass without a thin film (G), the ultraviolet-ray absorption spectrum was measured by using a spectrophotometer for visible and ultraviolet regions in accordance with a usual method. The results are shown in FIG. 6. As can be seen from this drawing, the spectrum of the material with a thin film (GT-1) shifted to the long wavelength side by approximately 50 nm, and it can be seen that its ultraviolet-ray absorption effect is large.

[Examples of Use]

Next, referring to the drawings, a description will be given of examples of use of the architectural material with the thin film formed thereon in accordance with the present invention.

Example 1 of Use

Figure 7:
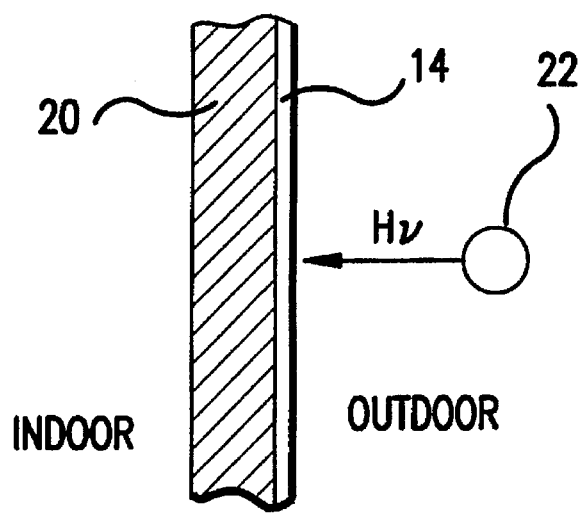
FIG. 7 is a cross-sectional view of the architectural material in use in the present invention with the thin film formed thereon, which is used as glass for an external wall portion in accordance with example 1 of use.

FIG. 7 shows an example in which the architectural material of the present invention is used as glass for an external wall portion. The architectural material of glass 20/metal-oxide thin film 14 was provided on an external wall portion as an external wall glass, with the thin-film surface facing toward the indoor side. The thin-film surface was irradiated by sunlight 22 from outdoors. In addition, artificial light (e.g. light emitted from the BL lamp, hereafter the same) may be concurrently applied from indoors onto the glass surface, or only the artificial light may be radiated thereto without sunlight. Consequently, mold, contaminants and the like attached to the thin-film surface were decomposed and removed. The ultraviolet wavelength region of the sunlight was absorbed by the glass/thin film. Hence, risk to the human body is small, and the deterioration of the interior material inside a building can be prevented.

Example 2 of Use

Figure 8:
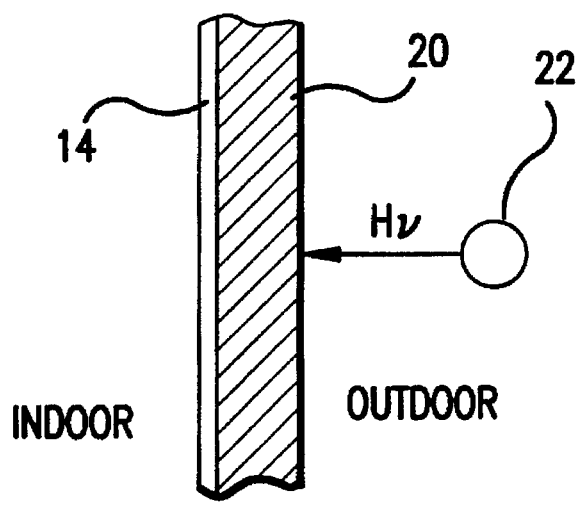
FIG. 8 is a cross-sectional view of the architectural material in use in the present invention with the thin film formed thereon, which is used as glass for an external wall portion in accordance with example 2 of use.

FIG. 8 shows another example in which the architectural material of the present invention was used as glass for an external wall portion. The architectural material with a thin film formed thereon, which was similar to that in example 1 of use, was used, and was provided on an external wall portion as an external wall glass, with the thin-film surface facing indoors. The glass surface was irradiated by sunlight 22 from outdoors. In addition, artificial light may be used from indoors in the same way as in example 1 of use. As a result, the indoor deodorizing effect was verified, and the effects of mold proofing, antisoiling, and ultraviolet-ray absorption were obtained in the same way as in example 1 of use.

Example 3 of Use

Figure 9:
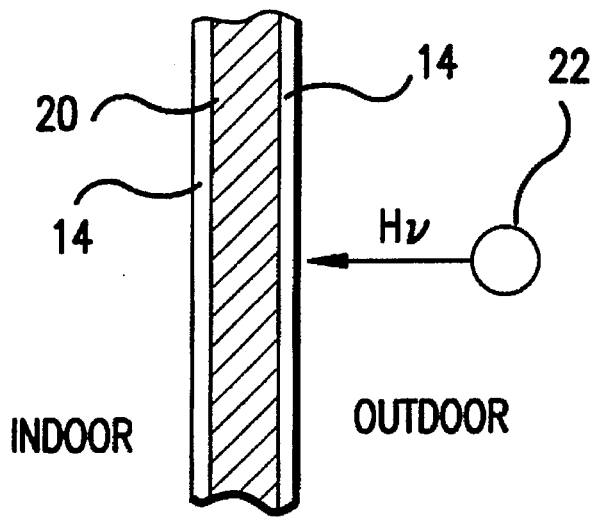
FIG. 9 is a cross-sectional view of the architectural material in use in the present invention with the thin film formed thereon, which is used as glass for an external wall portion in accordance with example 3 of use.

FIG. 9 shows still another example in which the architectural material of the present invention was used as the glass for an external wall portion. The architectural material with the metal-oxide thin film 14 formed on both sides of the glass 20 was provided on an external wall portion as an external wall glass. The architectural material was irradiated by sunlight 22 from outdoors. Also, artificial light may be used from indoors in the same way as in example 1 of use. As a result, the effects of examples 1 and 2 of use were verified.

Example 4 of Use

Figure 10:
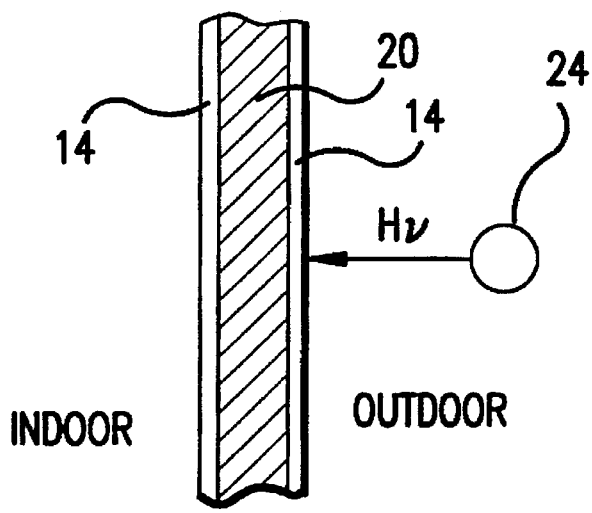
FIG. 10 is a cross-sectional view of the architectural material in use in the present invention with the thin film formed thereon, which is used as glass for an interior portion in accordance with example 4 of use.

FIG. 10 shows an example in which the architectural material of the present invention was used as glass for an interior portion. The architectural material used in example 3 of use was provided on an interior portion. Artificial light 24 and/or indirect sunlight was radiated thereto irrespective of the direction of radiation. As a result, an effect similar to that of example 3 of use was verified.

Example 5 of Use

Figure 11:
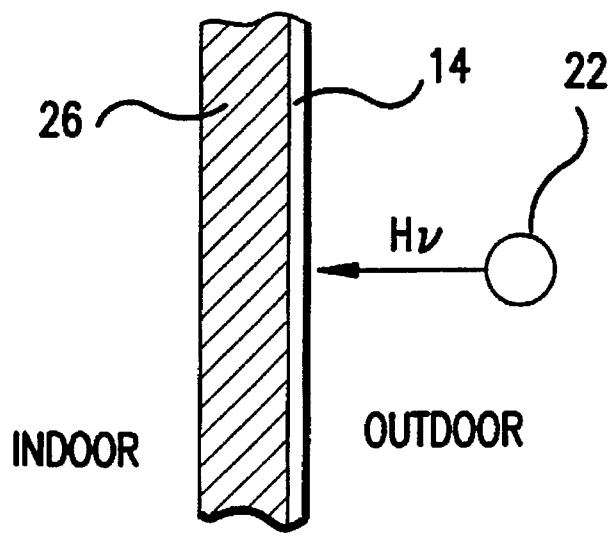
FIG. 11 is a cross-sectional view of the architectural material in use in the present invention with the thin film formed thereon, which is used for an external wall portion or a roof portion in accordance with example 5 of use.

FIG. 11 shows an example in which the architectural material of the present invention was used for an external wall portion or a roof portion. Sunlight 22 was radiated from outdoors onto the thin-film surface of the architectural material in which the metal-oxide thin film 14 was formed on an inorganic external wall material, such as tile, concrete, stone, or metal, or an inorganic roofing material 26 such as roof tile. Consequently, mold, contaminants and the like attached to the thin-film surface were decomposed and removed, or even if they were not completely decomposed, they were easily removed by being washed away (by rainwater) or the like.

Example 6 of Use

Figure 12:
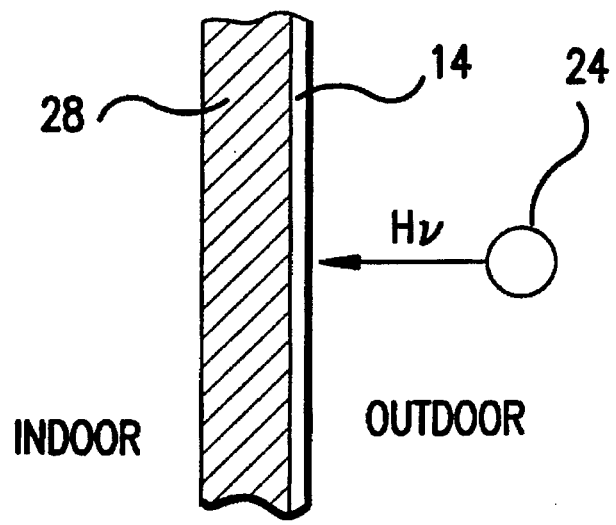
FIG. 12 is a cross-sectional view of the architectural material in use in the present invention with the thin film formed thereon, which is used as an interior material inside a building in accordance with example 6 of use.

FIG. 12 shows an example in which the architectural material of the present invention was used as trim material for the inside of a building. Artificial light 24 and/or sunlight 22 was radiated onto the thin-film surface of the architectural material in which the metal-oxide, transparent thin film 14 similar to that in example 5 of use was formed on an inorganic internal wall material, a flooring material, a ceiling material or the like 28 using tile, concrete, stone, metal, glass or the like. Consequently, it was possible to verify the effect of deodorizing the indoor space which was in contact with the thin-film surface, the effect of the mold proofing and antisoiling of the thin-film surface, and the effect of not impairing design features provided on the trim material. This fact shows that this architectural material can be effectively used in a living room, a toilet room or the like which are provided with an interior wall material, a flooring material, a ceiling material and the like.

Example 7 of Use

Figure 13:
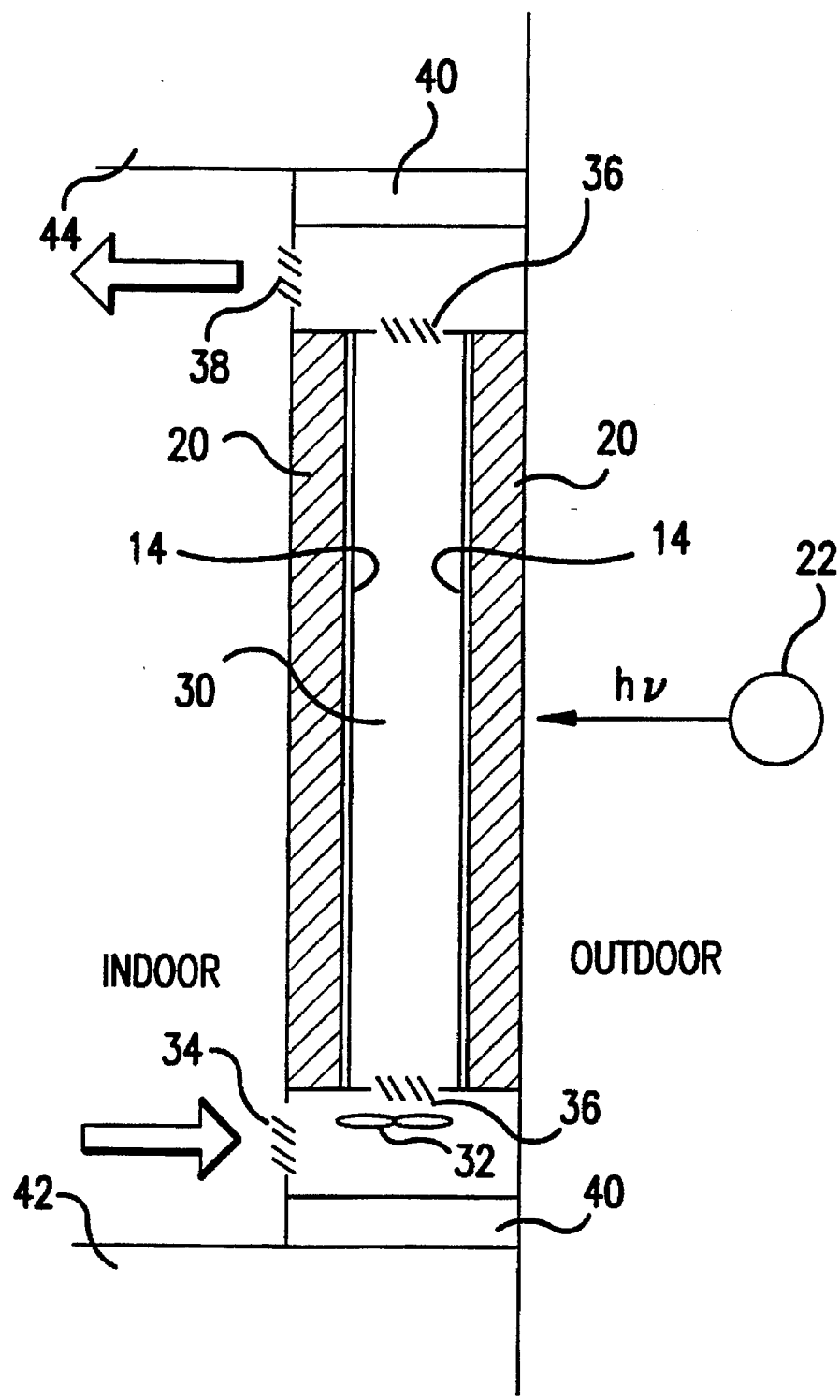
FIG. 13 is a cross-sectional view of the architectural material in use in the present invention with the thin film formed thereon, which is used for an indoor deodorizing device in accordance with example 7 of use.

FIG. 13 shows an example in which the architectural material of the present invention was used for an indoor deodorizing device. In this device, two sheets of Glass 20/metal-oxide thin film 14 architectural material are arranged with their thin-film forming surfaces facing each other, one toward the outdoor side and the other toward the indoor side, a gap 30 for passage of indoor air (a bad odor or a harmful gas) is provided between the two sheets of architectural material. A ventilation fan 32, an air flow inlet (louver) 34, and an air ventilation port (louver) 36 are provided at one end of this gap, while another air ventilation port (louver) 36 and an air flow outlet (louver) 38 are provided at the other end of the gap. These devices are supported by a wall 40 and a floor 42, as well as the wall 40 and a ceiling 44. The indoor air continuously flows into the gap through the inlet 34, and flows out to the room's interior through the outlet 38 via the gap. Thus, the indoor air circulates (arrows indicate the flow of air). As for this device, the outdoor-side glass surface was irradiated by sunlight 22 from outdoors. In addition, artificial light may be concurrently radiated onto the indoor-side glass surface, or only artificial light may be radiated thereon without using sunlight. As a result, the indoor bad odor, or harmful gas was brought into contact with the thin films, and was photochemically made odorless or harmless, and the effect of efficiently deodorizing the interior was obtained. In addition, the ultraviolet-ray absorption effect was verified.

Example 8 of Use

Figure 14:
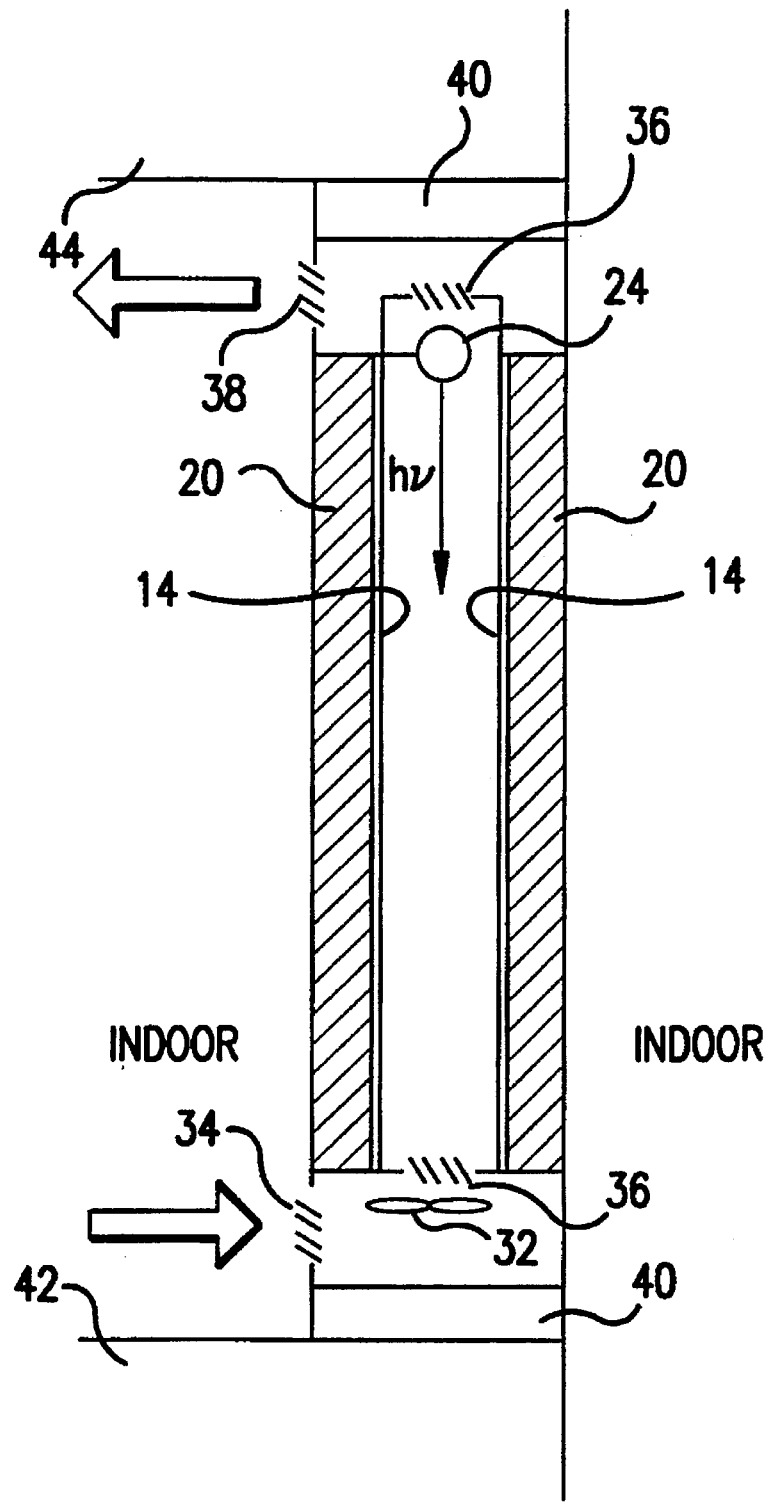
FIG. 14 is a cross-sectional view of the architectural material in use in the present invention with the thin film formed thereon, which is used for an indoor deodorizing device in accordance with example 8 of use.

FIG. 14 shows another example in which the architectural material of the present invention was used on an indoor deodorizing device. The arrangement provided was similar to that of example 7 of use except that the artificial light source 24 was provided at one end of the device and that this device was disposed inside a building. Although the artificial light 24 was radiated, sunlight may indirectly radiate from outdoors. The effect was similar to that of example 7 of use.
[Embodiment II]

Hereinafter, a detailed description will be given of a second embodiment of the present invention.

The architectural material in accordance with the second embodiment of the present invention is structured as follows: The surface of the architectural material and its vicinity are substantially formed of a metal mixture including a metal oxide which exhibits photocatalytic activity and a second metal for improving the photocatalytic activity of that metal oxide, and its inner portion is substantially formed of a metal mixture including a metal of the same kind as that which constitutes that metal oxide and the second metal for improving the photocatalytic activity of that metal oxide. The surface and its vicinity as well as the inner portion are formed continuously.

The metal oxide which is used in this embodiment and exhibits the photocatalytic function is not particularly limited. However, it is possible to cite those substances that are disclosed in Japanese Patent Publication No. 9850/1990. As specific examples, it is possible to cite titanium dioxide, iron oxide, silver oxide, copper oxide, tungsten oxide, aluminum oxide, zinc oxide, silicon dioxide, strontium titanate, and other similar compounds. It is preferable to use among them titanium dioxide, iron oxide, tungsten oxide, zinc oxide, and strontium titanate. In particular, titanium dioxide excels in deodorizing and antimold effects, is easy to obtain and process, and is therefore the most preferable. As the metal constituting the metal oxide exhibiting the photocatalytic activity, it is possible to cite titanium, iron, silver, copper, aluminum, tungsten, zinc, strontium, and the like.

In addition, the second metal for improving the photocatalytic activity of the metal oxide, i.e., the metal or other metal oxide which modifies the metal oxide, is a compound which coexists with the metal oxide and is capable of forming a site for reduction reaction in the photocatalytic reaction. For instance, it is possible to use at least one compound selected from platinum, palladium, gold, silver, copper, nickel, rhodium, niobium, tin, cobalt, ruthenium oxide, and nickel oxide. As for the amount of the second metal to be mixed in, it is preferable to use the second metal in the range of from 0.01 to 20 wt. % with respect to the metal oxide in the present invention.

In addition, the architectural material in accordance with this embodiment of the present invention is preferably structured such that the surface thereof and its vicinity are substantially formed of a metal mixture which is expressed by the following general formula (I):

$$[TiO_2]_x [TiM_y]_{1-x} \text{ or } [TiO_2]_x M_{1-x} \qquad (I)$$

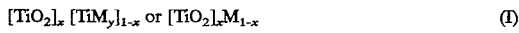

(where M represents a metal selected from the group consisting of Pt, Au, Pd, Ag, Cu, Ni, and Co; x is such that $0.3 \leq x < 1$; and y is an integer peculiar to the metal M combining with Ti and is any one of 1, 2, and 3), and its inner portion is a metal mixture which is expressed by the following general formula (II):

$$[Ti]_x [TiM_y]_{1-x} \text{ or } [Ti]_x M_{1-x} \qquad (II)$$

(where M represents a metal selected from the group consisting of Pt, Au, Pd, Ag, Cu, Ni, and Co; x is such that $0.3 \leq x < 1$; and y is an integer peculiar to the metal M combining with Ti and is any one of 1, 2, and 3).

In the case of this preferable form, the closer to the surface the portion is, the greater its content of titanium dioxide [$TiO_2$], and the greater the proportion of titanium [Ti].

x represents a molar ratio, shows a ratio between titanium dioxide or titanium in the metal mixture and the metal [M] for improving the catalytic function, and is preferably 0.7 to 0.9 or thereabouts.

In this embodiment, titanium dioxide, which is most suitable as a substance exhibiting the photocatalytic function, is used. The metal M for improving the photocatalytic function of titanium dioxide is a metal which is suitably used among metals which coexist with titanium dioxide and are capable of forming sites for reduction reaction in the photocatalytic reaction. These metals are generally called precious metals, and elements in Groups VIII and Ib can be typically cited. Here, the metal M is selected from the group consisting of platinum, gold, palladium, silver, copper, nickel, and cobalt which are highly effective. Among them, platinum, gold, palladium, and silver are preferable in view of deodorizing and antimold effects. Palladium is particularly preferable in view of ease of processing and the price.

In this embodiment, the word "substantially" is meant to include the presence of impurities or mixtures to such an extent that it does not impair the advantages of the present invention.

On the surface or its vicinity, titanium dioxide and the metal M selected from the group of metals, when combined, exhibit a structure similar to that of an alloy. In other words, the phase consisting of only titanium dioxide and the metal M, or the phase consisting of only titanium dioxide and a composite phase consisting of titanium dioxide and the metal M, exhibit a mixed structure (metal mixture) in which these metals are finely and uniformly dispersed. The closer to the inner portion of this metal mixture, the more titanium dioxide in the metal mixture is replaced by metal titanium, changing continuously to the metal mixture (alloy) consisting of metal titanium and the metal M.

Figure 15:
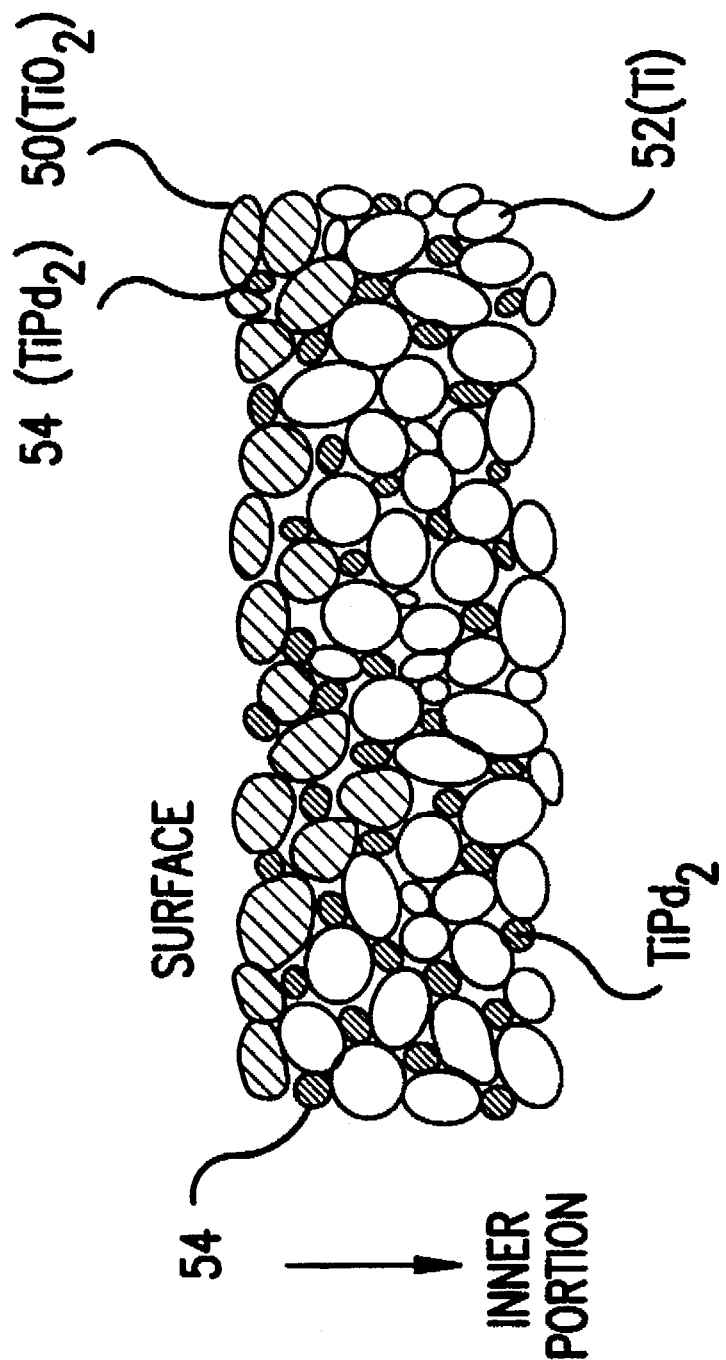
FIG. 15 is a cross-sectional view of a model showing a composite phase in the architectural material obtained from a titanium-palladium alloy.

FIG. 15 is a cross-sectional view of a model showing the state of phase of a metal mixture of the architectural material in accordance with the present invention in which M is palladium Pd. A $TiO_2$ phase 50 and a $TiPd_2$ phase 54 are dispersed on the surface and its vicinity. The $TiO_2$ phase exhibits the photocatalytic function, while the $TiPd_2$ phase promotes that function. The closer to the inner portion, a Ti phase 52, which is unrelated to the photocatalytic function, increases, and the structure becomes one in which the Ti phase 52 and the $TiPd_2$ phase 54 are dispersed. These portions of the metal mixture are formed continuously.

As described above, since the titanium dioxide/metal phase exhibiting the photocatalytic function and the titanium/metal phase serving as a carrier constitute an identical architectural material structure, the photocatalytic phase is prevented from peeling off, so that the architectural material is provided with the strength and peel resistance necessary for withstanding practical use.

Next, a description will be given of a method of manufacturing an architectural material, which is a third aspect of the present invention. As the manufacturing method, first, a metal mixture, i.e., an alloy, which contains the metal constituting the metal oxide exhibiting the photocatalytic activity and the second metal for improving the photocatalytic activity of the metal oxide, is manufactured. After the alloy is processed into a desired shape, the processed alloy is subjected to oxidation treatment. The metals which are used are the same as those of the above-described architectural material.

As the metal mixture, a metal mixture, i.e., alloy, which is expressed by the following general formula (II) is preferably used:

$$[Ti]_x [TiM_y]_{1-x} \text{ or } [Ti]_x M_{1-x} \qquad (II)$$

(where M represents a metal selected from the group consisting of Pt, Au, Pd, Ag, Cu, Ni, and Co; x is such that $0.3 \leq x < 1$; and y is an integer peculiar to the metal M combining with Ti and is any one of 1, 2, and 3).

The alloy expressed by general formula (II) above exhibits at room temperature a mixed structure in which "the α phase consisting of metal titanium and the metal M" are finely and uniformly dispersed, or a mixed structure in which "the α phase consisting of metal titanium and the composite phase consisting of metal titanium and the metal M" are finely and uniformly dispersed. x represents a molar ratio of titanium dioxide with respect to the metal M, while y represents a molar ratio of the metal M with respect to metal titanium in the composite phase consisting of metal titanium and the metal M.

The metal mixture (alloy) of such a mixed structure is manufactured, and after it is processed into a desired shape for use such as a sheet or a foil, the metal mixture is subjected to oxidation treatment. Before oxidation treatment is conducted, pretreatment such as heat treatment may be carried out. The metal mixture is subjected to forming, and surface cleaning is then carried out before oxidation treatment is provided. In view of the uniformity of treatment and the strength of the photocatalytic phase, it is preferable to conduct anodic oxidation treatment in an electrocatalytic solution. If oxidation treatment is provided, the surface of the "α phase consisting of metal titanium" is oxidized, thereby making it possible to form the titanium dioxide phase.

Thus, it is readily possible to obtain a rigid photocatalytic phase in which the phase consisting of titanium dioxide, which plays the role of oxidation decomposition reaction in the photocatalytic reaction, and the phase consisting of the metal M or the composite phase, consisting of the metal M and titanium, which plays the role of promoting the photocatalytic reaction as a catalyst for reduction reaction, are finely and uniformly dispersed in the alloy surface.

Example 1 of Manufacture

Figure 16:
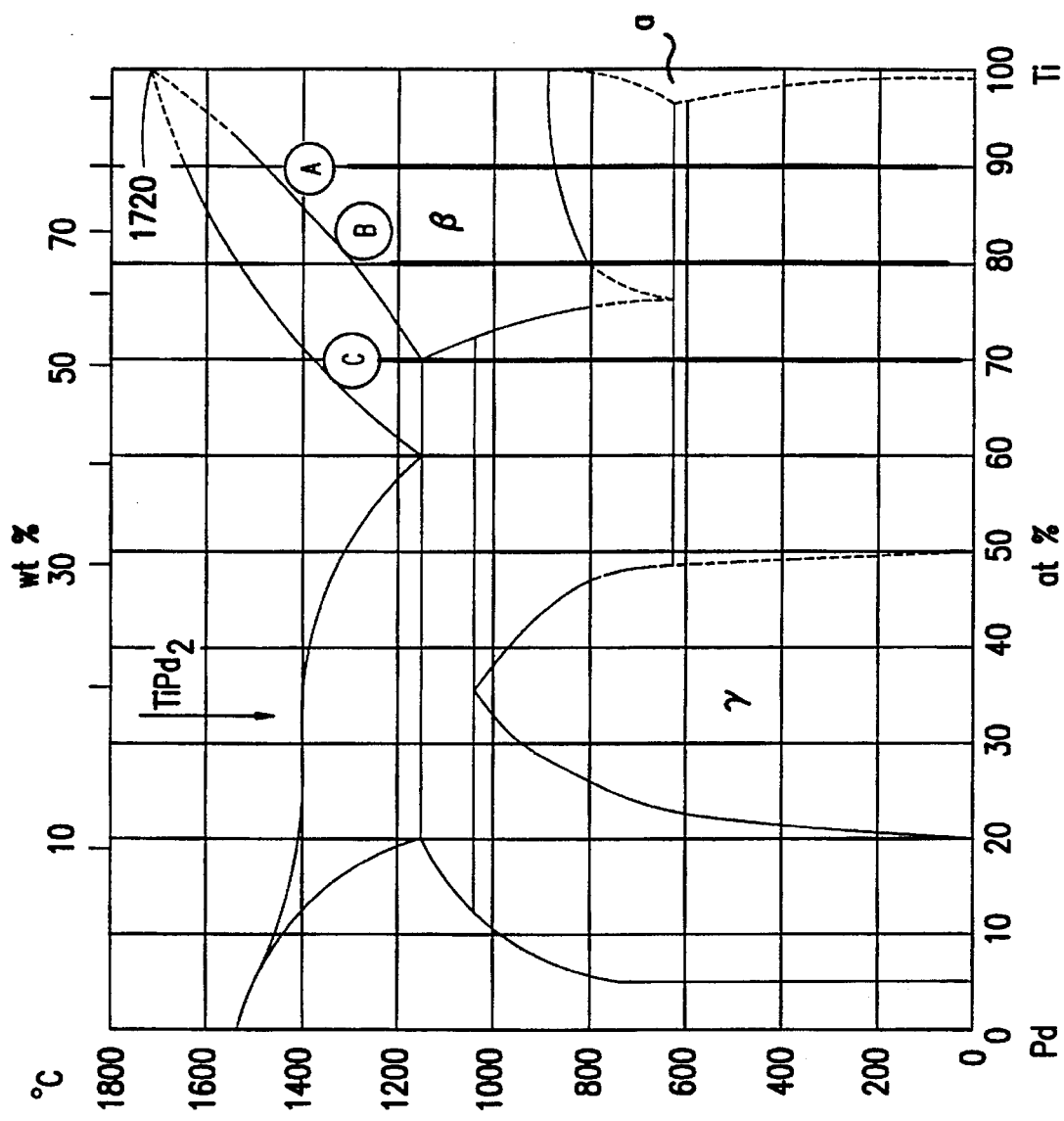
FIG. 16 is a diagram of the state of a titanium-palladium binary system.

The manufacture of an architectural material consisting of a titanium-palladium binary system FIG. 16 is a diagram of the state of a titanium-palladium binary system of a metal mixture.

This is a case where M is Pd in general formula (II). Metal mixtures (hereafter referred to as alloys) A, B and C were fabricated by being melted with compositions of x=0.9, 0.8, and 0.7, respectively.

Ingots of the alloys A, B and C were hot rolled into sheets of 110 mm in width and 2 mm in thickness at 900° C., and were acid pickled in an aqueous solution of 5 wt. % fluorine to remove oxide film from their surfaces. Then, they were cut into sizes of a 100 mm square and 1.6 mm in thickness.

Figure 17:
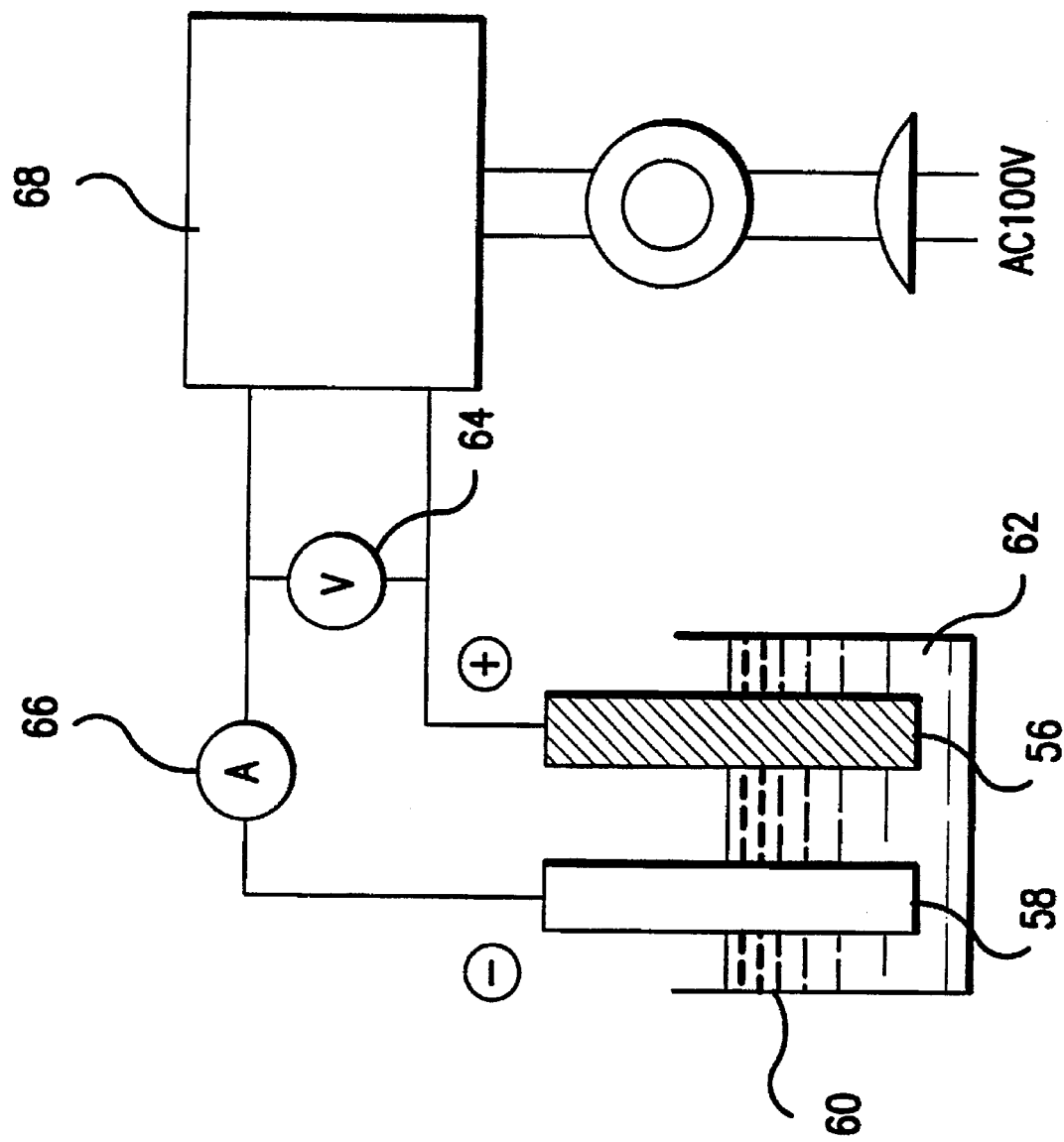
FIG. 17 is a schematic diagram of an anodic oxidation treatment apparatus.

FIG. 17 is a schematic diagram of an anodic oxidation treatment apparatus.

The alloy was connected to an anode 56, while metal aluminum was connected to a cathode 58. An aqueous solution 62 of 1 wt. % phosphoric acid was filled in a cell 60. While observing a voltmeter 64 and an ammeter 66 and adjusting the voltage, electric power was supplied from a dc power supply device 68 so as to effect anodic oxidation treatment. That is, the obtained metal tile was attached to the anode 56 of the anodic oxidation treatment apparatus, and anodic oxidation treatment was carried out in the aqueous solution of 1 wt. % phosphoric acid at a voltage of 10 to 250 V, thereby oxidizing the titanium phase (α phase) in each alloy and forming on its surface a titanium dioxide phase having a thickness of dozens of angstroms to several microns. Thus, metal tiles having the deodorizing and antimold functions were obtained.

Example 2 of Manufacture

Figure 18:
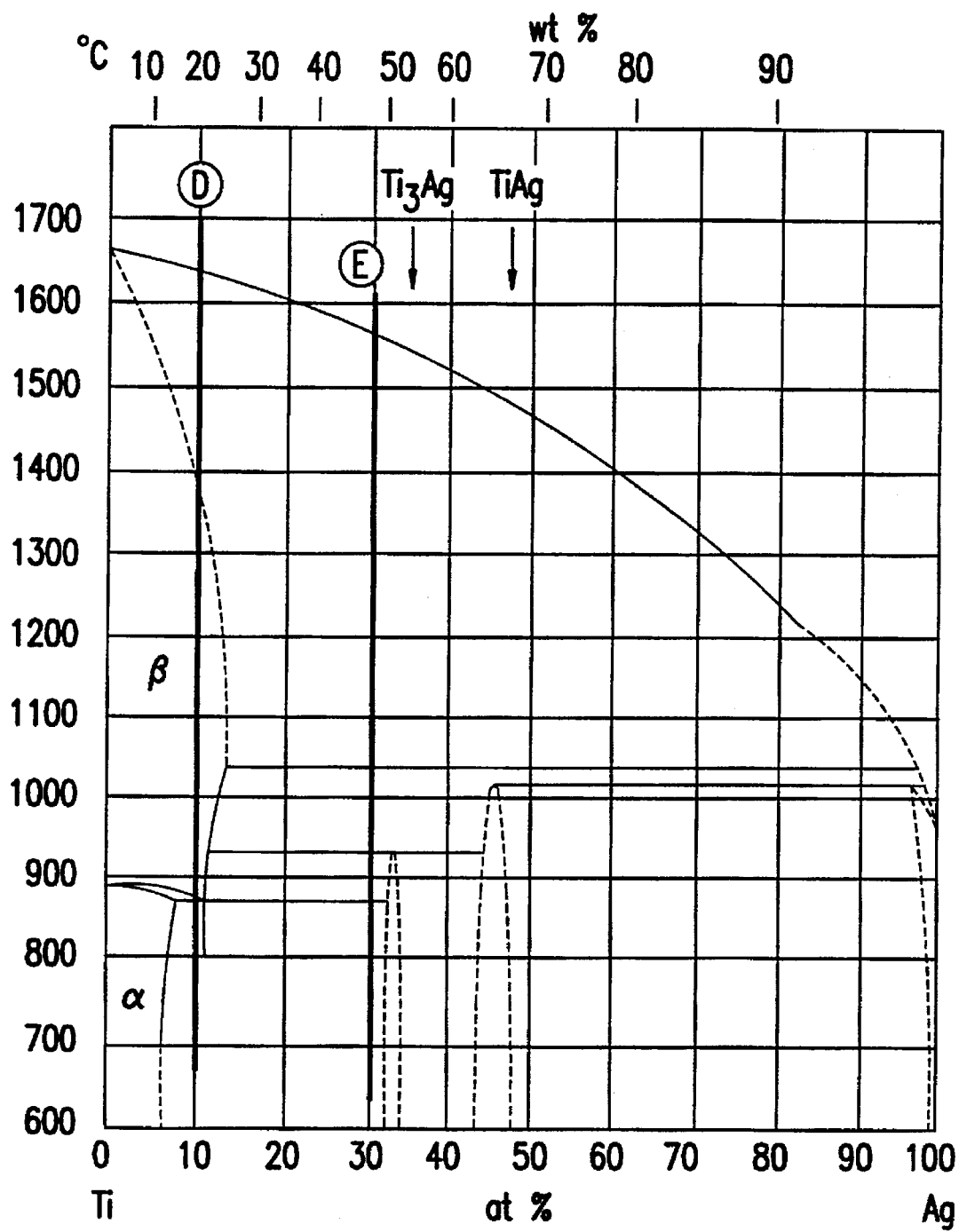
FIG. 18 is a diagram of the state of a titanium-silver binary system of a metal mixture.

The manufacture of an architectural material consisting of a titanium-silver binary system FIG. 18 shows a diagram of the state of a titanium-silver binary system of a metal mixture.

This is a case where M is Ag in general formula (II). Alloys D and E were fabricated by being melted with compositions of x=0.9 and 0.7, respectively.

Ingots of the alloys D and E were treated in the same manner as in example 1 of manufacture, and metal tiles having the deodorizing and antimold functions were obtained.

Example 5 of Evaluation of Deodorizing Property

Evaluation of the deodorizing property of metal tiles

Figure 19:
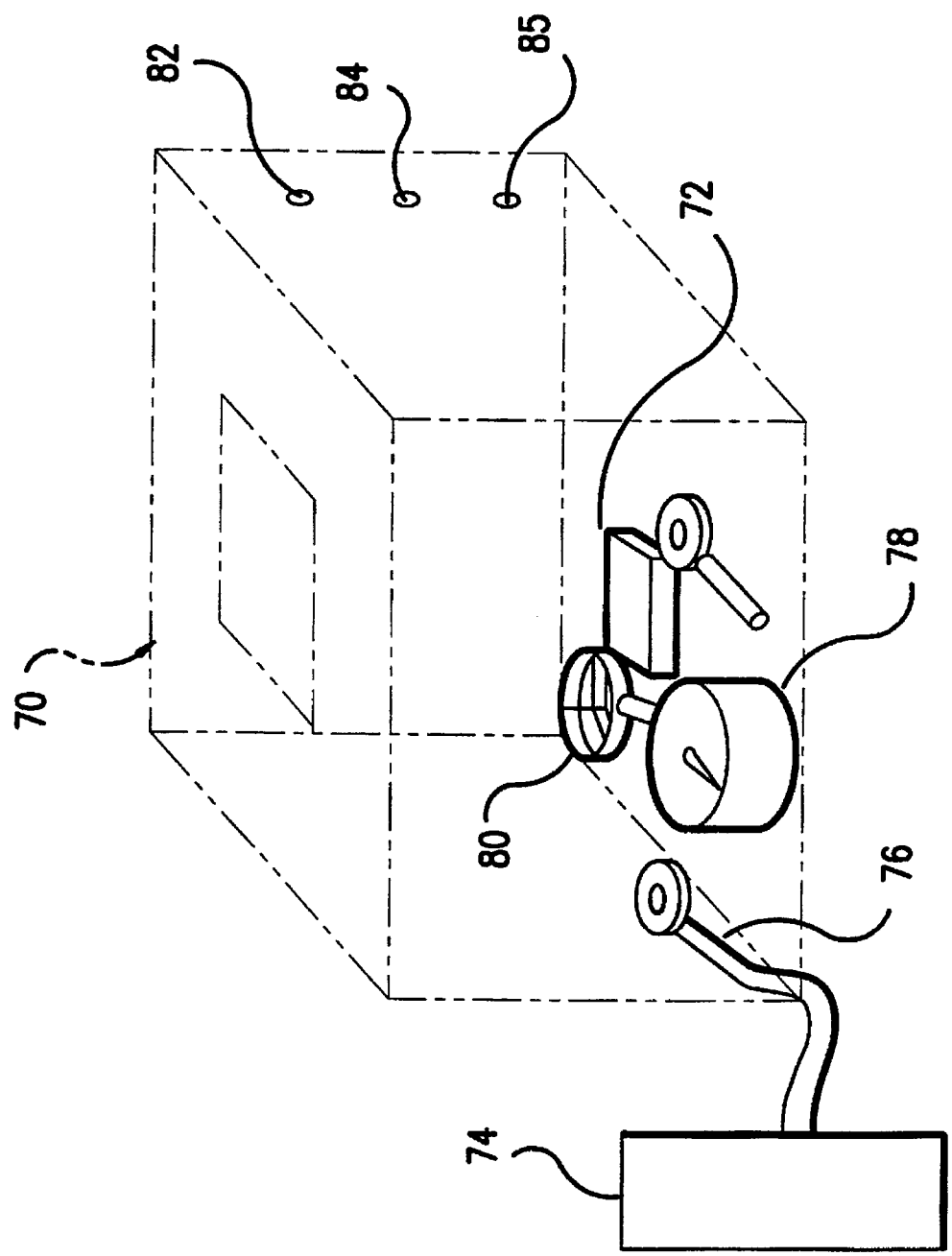
FIG. 19 is a schematic diagram of a testing apparatus for evaluating the deodorizing property.

FIG. 19 shows a schematic diagram of a testing apparatus for evaluating the deodorizing property.

A sample 72 was placed in the bottom of an experiment tank 70 made of quartz glass. An aldehyde gas was supplied to the experiment tank 70 from a standard-gas generating device 74 via a gas supply port 76. A pressure gage 78 and an agitator 80 were placed in the apparatus. The state of the interior was observed by means of a gas sensor 82, a hygrothermograph 84, and an ultraviolet-ray intensity meter 86.

The metal tile samples obtained in examples 1 and 2 of manufacture were placed, with the treated surfaces facing upward, in the bottom of the experiment tank made of quartz glass in the testing apparatus for evaluating the deodorizing property.

5 ppm of aldehyde was introduced into the evaluating apparatus through the gas supply port 76, and the light was radiated from the BL lamp (black lamp) (not shown) from above the evaluating apparatus. The change over time of the aldehyde concentration at that time was measured by gas chromatography, and the degree of a decline in the aldehyde residual rate was used as an index of the deodorizing performance.

As a comparative sample, an evaluation was similarly made in which a titanium dioxide-palladium thin film obtained by applying an aqueous solution of a titanium dioxide sol thereon was formed on a metal tile.

Figure 20:
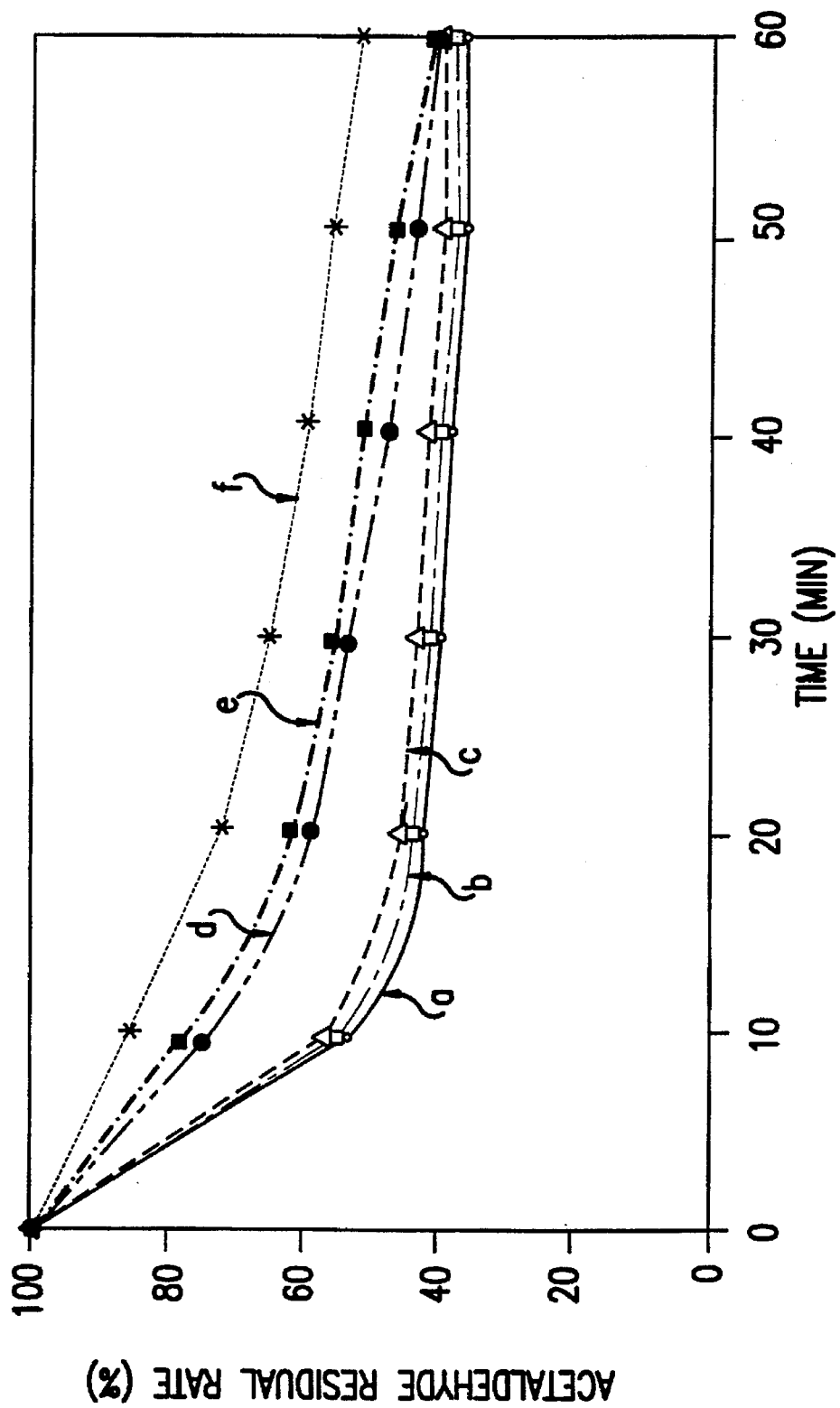
FIG. 20 is a graph showing a change in the residual concentration of acetaldehyde.

FIG. 20 is a graph showing a change in the residual concentration of acetaldehyde.

In FIG. 20, a represents a curve which shows the residual concentration of acetaldehyde in the metal tile obtained from the alloy A; and b, c, d, and e represent curves which show the residual concentrations of acetaldehyde in the metal tiles obtained from the alloys B, C, D, and E, respectively. f represents a curve which shows the residual concentration of acetaldehyde in the metal tile obtained from the comparative sample.

Example 1 of Evaluation of Peel Resistance

Evaluation of peel resistance of metal tiles

Figure 21:
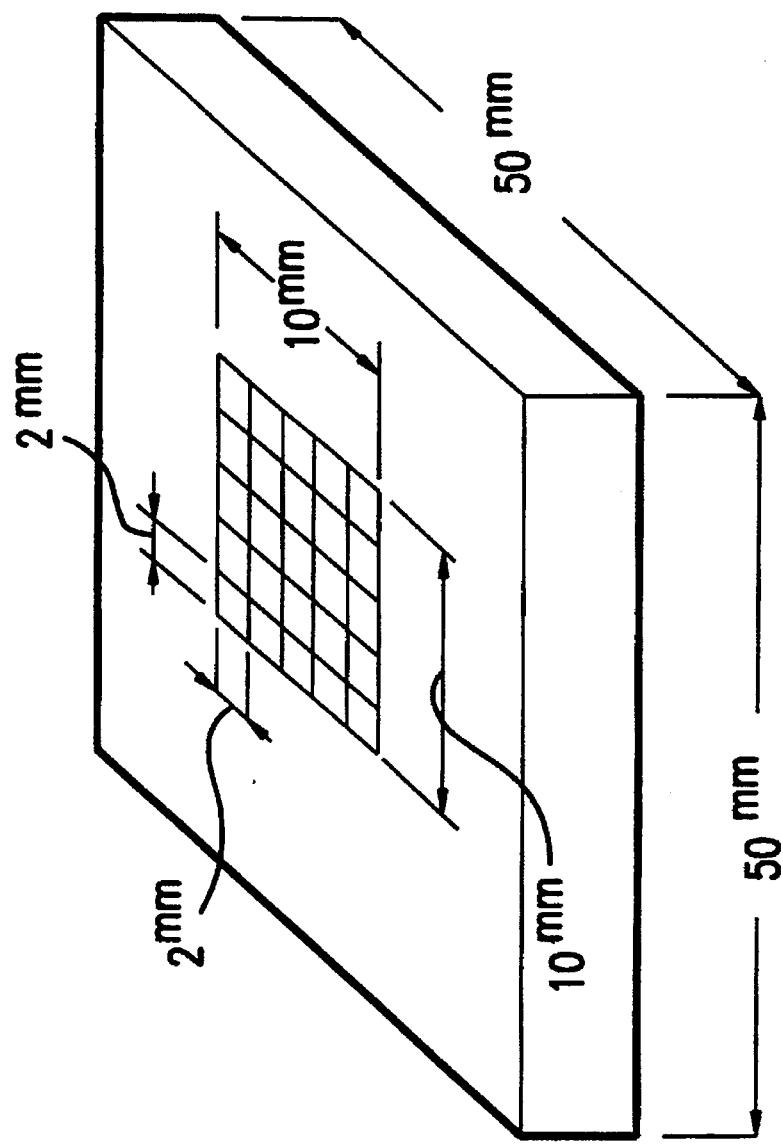
FIG. 21 is a schematic diagram of a testing method for evaluating peel resistance.

FIG. 21 shows a schematic diagram of a testing method for evaluating peel resistance.

As shown in FIG. 21, 10 mm-long scars were inscribed at 2-mm intervals in a central portion of the surface of each sample by using a cutter knife, thereby forming 5×5 squares.

Then, an adhesive tape was attached to a surface portion covering the squares. After rubbing sufficiently from over the tape, the tape was peeled off, and by microscopically observing the cut portions of the sample, the number of squares in which the titanium dioxide film remained without being peeled off was counted and set as a parameter of peel strength.

As a comparative sample, an evaluation was similarly made of a titanium dioxide film of 1 µm in thickness formed on a 5-cm-square glass plate by means of spin coating.

In all the metal tiles obtained by subjecting the items of the present invention, i.e., the alloys A, B, C, D and E, to oxidation treatment, the titanium dioxide film was not peeled off, the number of squares remaining intact being 25. In the comparative sample, the film was peeled off in all the squares, and the result was 0. Thus, the metal tiles obtained in accordance with the present invention exhibit peel resistance.

It is known that titanium dioxide produces various colors depending on the film thickness thereof. Since the thickness of the titanium dioxide film is substantially proportional to the anodic oxidation voltage, it is possible to obtain metallic architectural materials which produce various colors by controlling the oxidation voltage. In addition, since the surface phase and the inner phase are formed continuously, excellent surface strength is exhibited irrespective of the thickness of the titanium dioxide film. Hence, it is possible to arbitrarily obtain architectural materials which produce colors suited to purposes by the adjustment of the oxidation voltage, so that these architectural materials are preferable in terms of design as well.

Since the architectural material of the present invention uses a titanium alloy as its base material, the architectural material excels in workability, and a desired shape can be obtained easily. Since anodic oxidation permits fine and uniform surface oxidation treatment, an architectural material of a complicated shape can be provided with a uniform and excellent photocatalytic capability.

The architectural material of the present invention may be used as it is by processing the metal into an arbitrary shape as described above, or a thin sheet with a thin film formed thereon may be formed of alloys in advance and subjected to oxidation treatment, and a thin-film material thus prepared and displaying the deodorizing and antimold functions may be joined to a base material so as to be used.

As a method of using the architectural material of the present invention, the architectural material may be used as it is as a metal tile or an interior trim material, or the thin sheet/thin film architectural material having a combined structure in accordance with the present invention may be prepared and used by being joined to ceramics, mortar, glass, iron plates, aluminum plates, and the like which are existing architectural materials. Thus, in accordance with the method in which the architectural material of the present invention is used by being joined to existing materials, the reduction in the amount of alloys used becomes possible, and it is possible to provide architectural materials displaying excellent deodorizing and antimold functions at low cost.

The architectural material in accordance with the present invention offers outstanding advantages in the property of deodorizing an indoor space which comes in contact with the architectural material and in the antimold property, antisoiling property, and ultraviolet-ray absorbency of the surface of the architectural material, and in the long-term maintenance of these properties and economic efficiency, without impairing features of design. The architectural material in accordance with a second aspect of the present invention has high uniformity of material, excels in deodorizing and antimold functions, is easy to manufacture, has high strength. The material also excels in durability, and facilitates processing into a shape suited to a purpose. Furthermore, in accordance with the manufacturing method in accordance with the present invention, it is possible to readily obtain an architectural material of a desired shape, which is uniform and has superior deodorizing and antimold effects.

What is claimed is:

1. A method of manufacturing an architectural material, comprising the steps of:

fabricating an alloy including a first metal for forming a metal oxide exhibiting photocatalytic activity and including a second metal for improving the photocatalytic activity of said metal oxide;

processing the fabricated alloy into a desired shape; and subjecting the processed alloy to anodic oxidation treatment for forming said metal oxide without oxidizing said second metal to obtain a metal mixture wherein said metal oxide and said second metal are finely and uniformly dispersed.

2. A method of manufacturing an architectural material according to claim 1, wherein said metal constituting said metal oxide exhibiting the photocatalytic activity is selected from the group consisting of titanium, iron, silver, copper, aluminum, tungsten, zinc, and strontium.

3. A method of manufacturing an architectural material according to claim 1, wherein said second metal for improving the photocatalytic activity of said metal oxide is selected from the group consisting of platinum, gold, palladium, silver, copper, nickel, rhodium, niobium, tin, and cobalt.

4. A method of manufacturing an architectural material according to claim 1, wherein the fabricated alloy is expressed by the following general formula (II):

$$[Ti]_x[TiM_y]_{1-x} \text{ or } [Ti]_xM_{1-x} \qquad (II)$$

wherein M represents a metal selected from the group consisting of Pt, Au, Pd, Ag, Cu, Ni, and Co; x is such that $0.3 \leq x < 1$; and y is an integer peculiar to said metal M combining with Ti and is any one of 1, 2, and 3.

5. A method of manufacturing an architectural material according to claim 1, wherein the fabricated alloy includes titanium and palladium and, after said fabricated alloy is processed into the desired shape, the processed alloy is subjected to the anodic oxidation treatment.

6. A method of manufacturing an architectural material according to claim 1, wherein the fabricated alloy includes titanium and palladium, said processing step includes processing the fabricated alloy into the shape of a thin film, and said subjecting step includes subjecting the processed alloy to the anodic oxidation treatment, and further comprising the step of joining the anodized alloy to the surface of an architectural material.

7. A method of manufacturing an architectural material according to claim 1, wherein said fabricating step includes fabricating titanium as said first metal.

8. A method of manufacturing an architectural material according to claim 7, wherein said fabricating step includes fabricating palladium as said second metal.

9. A method of manufacturing an architectural material according to claim 8, wherein said fabricating step includes fabricating said palladium in the form of $TiPd_2$.

10. A method of manufacturing an architectural material according to claim 1, wherein said fabricating step includes fabricating palladium as said second metal.

11. A method of manufacturing an architectural material according to claim 10, wherein said fabricating step includes fabricating said palladium in the form of $TiPd_2$.

* * * * *